Oct. 7, 1941. A. E. BRICKMAN 2,258,533
COUPLING FOR INTERCONNECTING FLEXIBLE MEMBERS
Filed June 24, 1940     2 Sheets-Sheet 1

*Inventor:*
ALAN E. BRICKMAN,
by: John E. Jackson
*his Attorney.*

Oct. 7, 1941.   A. E. BRICKMAN   2,258,533
COUPLING FOR INTERCONNECTING FLEXIBLE MEMBERS
Filed June 24, 1940   2 Sheets-Sheet 2
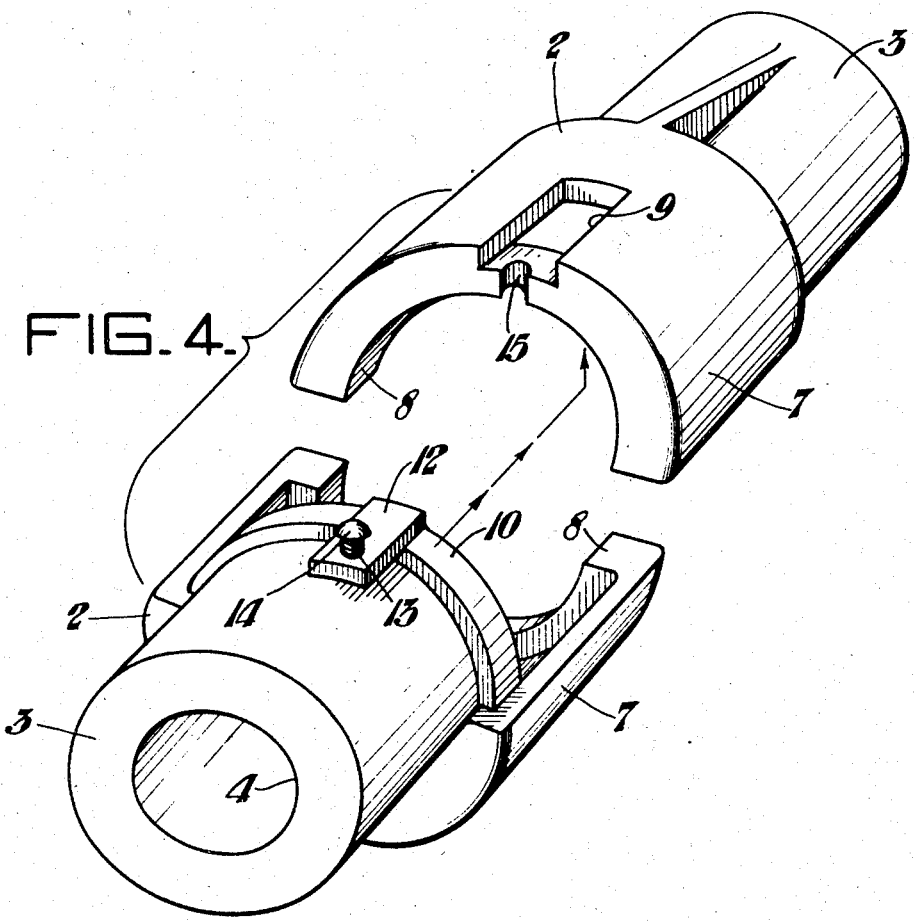
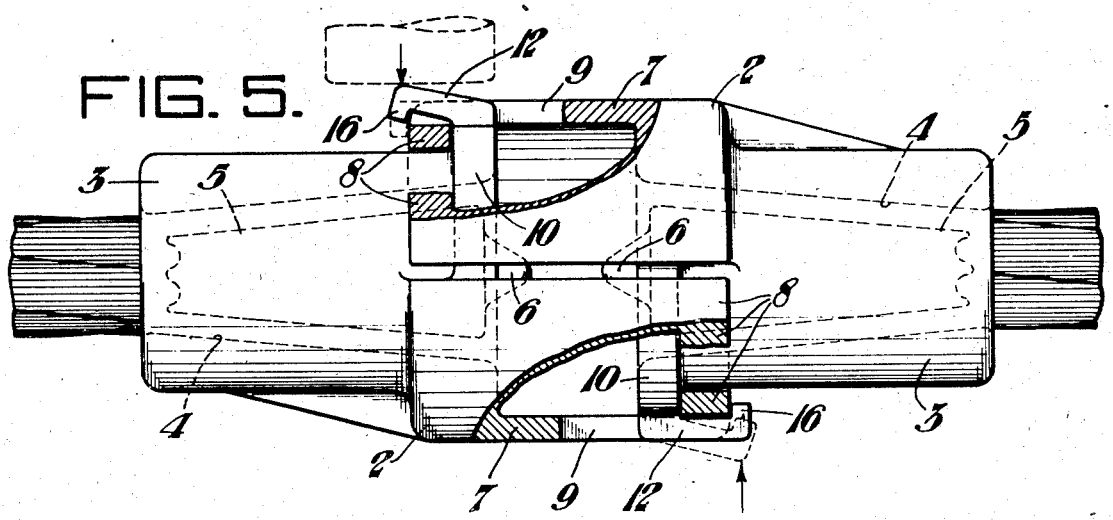
Inventor:
ALAN E. BRICKMAN,
by John E. Jackson
his Attorney.

Patented Oct. 7, 1941

2,258,533

UNITED STATES PATENT OFFICE 2,258,533

COUPLING FOR INTERCONNECTING FLEXIBLE MEMBERS

Alan E. Brickman, Rostraver Township, Westmoreland County, Pa.

Application June 24, 1940, Serial No. 342,166

6 Claims. (Cl. 287—103)

This invention relates to couplings for interconnecting the adjacent ends of oppositely extending flexible members, and particularly to an improved coupling for interconnecting the ends of wire ropes such as are used in highway guards of the cable type.

Various types of couplings for interconnecting the ends of wire ropes or cables, such as those used in connecting the wire ropes of a highway guard cable together, have been suggested and used. While most of the couplings heretofore employed, satisfactorily held the ends of the wire ropes together, they were unsatisfactory and impractical however in certain other respects. Some of these couplings were complicated in their construction and expensive to manufacture and others consisted of an excessive number of parts and were difficult and tedious to assemble.

In the present invention, there is provided an improved coupling for interconnecting the ends of flexible members, such as wire ropes or cables and the like, consisting of a minimum number of parts and at the same time one that can be easily and quickly assembled.

Accordingly, it is one of the objects of the present invention to provide an improved coupling for interconnecting the ends of flexible members which is simple and inexpensive in its construction and, yet, one which is strong and rugged, and practical in its use.

It is another object of the invention to provide an improved coupling for interconnecting the ends of flexible members which can be easily and conveniently assembled at a minimum cost, and at the same time, a coupling which securely and effectively holds the ends of the flexible members together.

It is a further object of this invention to provide an improved coupling consisting of two interengaging members for interconnecting the ends of flexible members, such as wire ropes and cables, and the like, which insures that each interengaging member is securely and properly attached to the ends of their respective wire ropes before the members can become engaged and the coupling can be completely assembled.

Various other objects and advantages of my invention will be more apparent in the course of the following specification and will be particularly pointed out in the appended claims.

In the accompanying drawings there is shown, for the purpose of illustration, one embodiment and several modifications thereof which my invention may assume in practice.

In these drawings:

Figure 4 is a perspective of the coupling of the present invention; and

Figure 5 is a plan partly in section showing a modified form of construction of the improved coupling of my invention.

Figure 1:
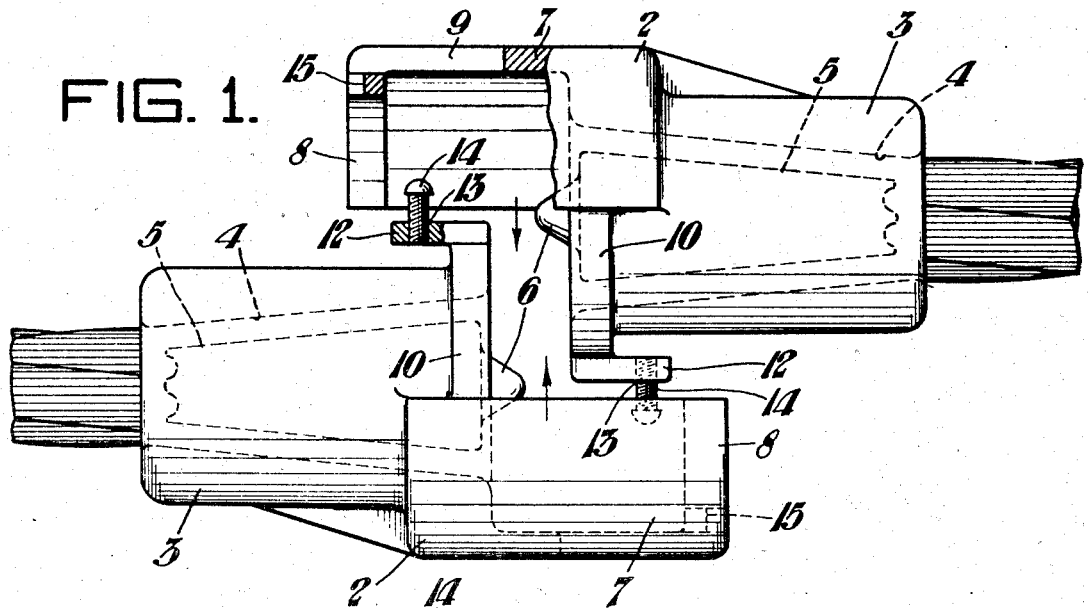
Figure 1 is a plan of the improved coupling of my invention partly in section showing the first step in the assembling thereof.

Referring more particularly to the drawings, the improved coupling of my invention comprises a pair of interengaging members 2 with one arranged on the adjacent ends of each of the wire ropes or other flexible members to be joined. Each of the interengaging members 2 consists of a cylindrical body portion 3 having an outwardly tapered socket portion 4 arranged therethrough axially thereof. The interengaging members are attached to the ends of the wire ropes preferably by inserting the end thereof into the tapered socket portion of the body member and driving a wedge member 5 into the end of the wire rope or flexible member so as to spread the strands of the same whereby the interengaging member is fixedly attached thereto. Each of the wedge members 5 has a projecting portion 6 integrally arranged therewith on the outer end thereof for a purpose hereinafter to be described.

There is integrally arranged with the body portion 3 on one side thereof an enlarged hollow semi-cylindrical portion 7 extending outwardly in a longitudinal direction therefrom having an inwardly extending flange 8 disposed therewithin and therearound on the outer end thereof. The semi-cylindrical portion 7 has a preferably rectangular shaped opening 9 arranged therethrough substantially centrally thereof next to the inwardly extending flange 8 carried thereby. There is disposed on the outer end of the body portion 3 around that part of the same on the side opposite from that of the semi-cylindrical portion 7, a laterally and outwardly extending flange portion 10 which is integrally arranged therewith. There is carried by the flange portion 10 substantially centrally thereof, an inwardly extending hook-like projecting portion 12 preferably having an opening 13 arranged therein adjacent the end thereof for receiving a drive pin 14 or other suitable locking pin.

The interengaging members 2 are assembled in the following manner:

Each of the interengaging members 2 is first securely attached to the respective ends of the wire ropes or other flexible members to be joined by inserting the ends of the wire rope or flexible members into the tapered socket portions 4 of the respective body portions 3 so that the rope ends are substantially flush with the outer end thereof. The wedges 5 are then driven into the ends of the wire rope to their proper position therein so as to spread the strands thereof whereby the interengaging members are fixedly secured to the ends of their respective ropes.

Figure 2:
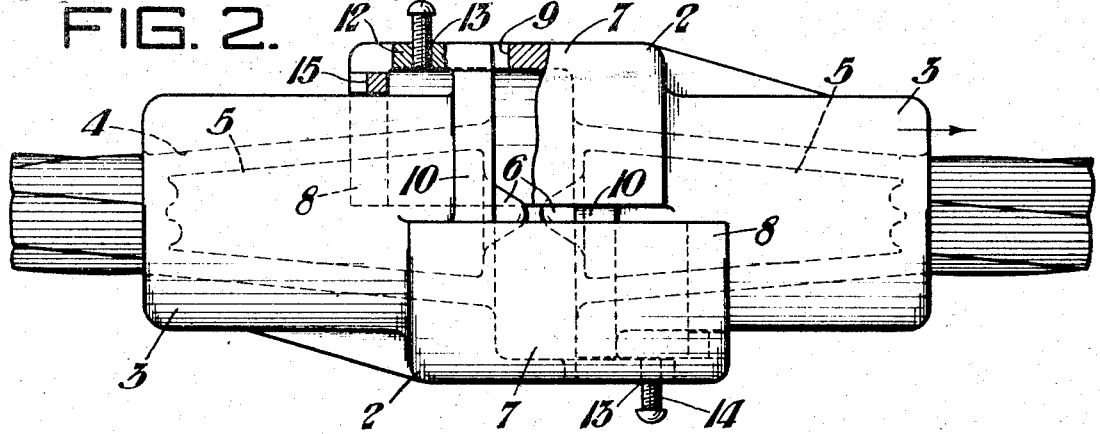
Figure 2 is a similar view showing the second step in the assembling thereof.
Figure 3:
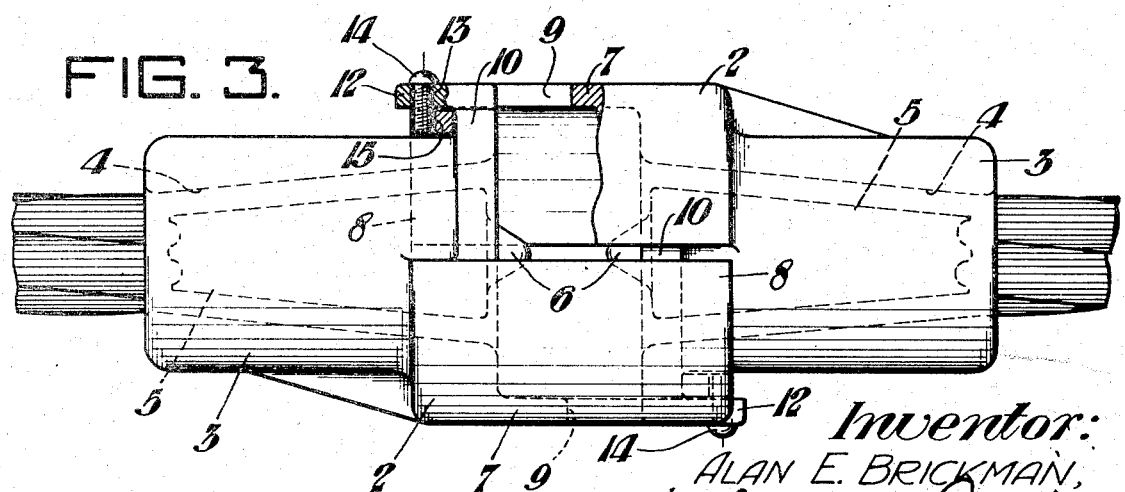
Figure 3 is a view partly in section showing the coupling completely assembled.

The interengaging members 2 are then positioned opposite each other as shown in Figures 1 and 4 of the drawings, and moved into engagement with each other by positioning the flange portion 10 carried by the body member 3 of one of the interengaging members into the hollow semi-cylindrical portion 7 of the other interengaging member so that the hook-like projecting portions 12 carried by each of the flange portions 10 will pass through the opposed rectangular shaped openings 9 arranged in each of the semi-cylindrical portions 7, as shown in Figure 2 of the drawings. After the interengaging members have been moved to such a position, they are pulled or moved away from each other in a longitudinal direction until the flanges 8 disposed on the outer end of the semi-cylindrical portions 7 come in contact with and abut against the flanges 10 arranged on the outer end of the body portions 3, as shown in Figure 3 of the drawings. In such position, it will be seen that the hook-like projecting portions 12 carried by the flanges 10 are disposed in the rectangular openings 9 carried by the semi-cylindrical portions 7 and extend over the top of the flanges 8 arranged on the outer end of the semi-cylindrical portions 7. The driving pins 14 arranged in the end of the hook-like projections 12 are then driven inwardly toward the center of the rope behind the flanges 8, and preferably into guiding notches 15 arranged in the outer wall thereof. It will thus be seen that the flanges 10 carried by the body portions 3 and the flange portions 8 carried by the semi-cylindrical portions 7 are securely locked together in abutting relation and that the interengaging members 2 are securely locked into engagement with each other.

In Figure 5, there is shown a modification of the coupling of the present invention. In this construction, the hook-like projecting portions 12 have lip-like portions 16 arranged on the outer end thereof which are adapted to be forced downwardly around the outer side of the flanges 8 carried by the semi-cylindrical portions 7 when the interengaging members are assembled together so as to fixedly hold the flanges 8 and 10 together and to lock the interengaging members 2 securely into engagement with each other.

It will be understood that the flanges 10 together with the hook-like projections 12 carried by the body portions 3 are spaced the proper distance from the inwardly extending flanges 8 carried by the semi-cylindrical portions 7 so that the interengaging members cannot be brought completely into engagement with each other unless the wedges 5 are properly driven and seated in the ends of the ropes or flexible members in the tapered socket portions 4 of the body portions. Thus, it will be seen that if the wedges 5 are not properly positioned in the ends of the flexible members, the projecting portions 6 carried thereby will interfere with each other upon attempting to assemble the members together thereby preventing the complete assemblage thereof. That is to say, the interengaging members 2 cannot be assembled unless the wedges 5 are properly positioned in the ends of the flexible members thereby insuring that the body portions 3 of the interengaging members are securely attached to the ends of the wire ropes or other flexible members before the coupling can be assembled which is one of the most important aspects of the coupling of this invention.

As a result of my invention, it will be seen that there is provided an improved coupling consisting of only two inexpensive parts which can be easily and conveniently assembled with each other in a minimum amount of time and, at the same time providing a coupling which is symmetrical in form and one having a substantially smooth contour upon assemblage thereby tending to eliminate any damage that might incur due to colliding traffic sliding into and along the ropes, which is a decided advantage.

While I have shown and described several embodiments of my invention, it will be understood that these embodiments are merely for the purpose of illustration and description, and that various other forms may be devised within the scope of my invention, as defined in the appended claims.

I claim:

1. A coupling comprising two oppositely disposed substantially identical interengaging members, each of said interengaging members consisting of a body portion, an outwardly extending portion integrally arranged with the body portion on one side thereof having an inwardly extending flange portion disposed on the outer end thereof, a laterally and outwardly extending flange portion integrally arranged with the body portion adjacent the outer end thereof on the side opposite from that of said outwardly extending portion, said inwardly extending flange portion carried by the outer end of the outwardly extending portion of one of said interengaging members adapted to lie directly next to and rearwardly of the oppositely disposed flange carried by the body portion of the other of said interengaging members and cooperating therewith to securely hold them in engagement with each other.

2. A coupling comprising two oppositely disposed substantially identical interengaging members, each of said interengaging members consisting of a body portion, an enlarged hollow semi-cylindrical portion integrally arranged with the body portion on one side thereof and extending outwardly in a longitudinal direction therefrom, said semi-cylindrical portion having an inwardly extending flange disposed therewithin and therearound on the outer end thereof, and a laterally and outwardly extending flange portion integrally arranged with the body portion adjacent the outer end thereof around that part of the same on the side opposite from that of said semi-cylindrical portion, said inwardly extending flange carried by the outer end of the semi-cylindrical portion of one of said interengaging members adapted to lie directly next to and rearwardly of the oppositely disposed flange portion carried by the body portion of the other of said interengaging members and cooperating therewith to securely hold them in engagement with each other.

3. A coupling comprising two oppositely disposed substantially identical interengaging members, each of said interengaging members consisting of a body portion, an enlarged hollow semi-cylindrical portion integrally arranged with the body portion on one side thereof and extending outwardly in a longitudinal direction therefrom, said semi-cylindrical portion having an inwardly extending flange disposed therewithin and therearound on the outer end thereof, a laterally and outwardly extending flange portion integrally arranged with the body portion adjacent the outer end thereof around that part of the same on the side opposite from that of said semi-cylindrical portion, said inwardly extending flange carried by the outer end of the semi-cylindrical portion of one of said interengaging members adapted to lie directly next to and rearwardly of the oppositely disposed flange portion carried by the body portion of the other of said interengaging members and cooperating therewith to securely hold them in engagement with each other, and means for locking the flanges of both said semi-cylindrical portion and said body portion securely together whereby the interengaging members are fixedly locked into engagement with each other.

4. A coupling comprising two oppositly disposed substantially identical interengaging members, each of said interengaging members consisting of a cylindrical-shaped body portion having a socket portion arranged therethrough, an enlarged hollow semi-cylindrical portion integrally arranged with the body portion on one side thereof and extending outwardly in a longitudinal direction therefrom, said semi-cylindrical portion having an inwardly extending flange disposed therewithin and therearound on the outer end thereof, an outwardly and upwardly extending flange portion integrally arranged with the body portion adjacent the outer end thereof around that half of the same on the side opposite from that of said semi-cylindrical portion, said inwardly extending flange carried by the outer end of the semi-cylindrical portion of one of said interengaging members adapted to lie directly next and rearwardly of the oppositely disposed flange portion carried by the body portion of the other of said interengaging members and cooperating therewith to securely hold them in engagement with each other, and means for locking the flanges of both said semi-cylindrical portion and said body portion securely together so as to provide a rugged and symmetrical coupling connection whereby the interengaging members are firmly locked in engagement with each other.

5. A coupling comprising two oppositely disposed substantially identical interengaging members, each of said interengaging members consisting of a body portion, an enlarged hollow portion integrally arranged with the body portion on one side thereof and extending outwardly in a longitudinal direction therefrom, said outwardly extending hollow portion having an inwardly extending flange disposed on the outer end thereof and having an opening arranged therethrough centrally thereof directly next to said flange, a laterally and outwardly extending flange portion integrally arranged with the body portion adjacent the outer end thereof around that part of the same on the side opposite from that of said outwardly extending hollow portion, said last named flange having a rearwardly extending hook-like projecting portion integrally arranged therewith substantially centrally thereof, said inwardly extending flange carried by the outer end of said outwardly extending hollow portion of one of said interengaging members adapted to lie directly next and rearwardly of the oppositely disposed flange portion carried by the body portion with the hook-like projecting portion arranged on the flange of the body portion of one of the interengaging members adapted to be positioned in the opening arranged in the outwardly extending hollow portion of the other of said interengaging members so as to be disposed over the inwardly extending flange carried by that hollow portion, and means carried by each of said hook-like extending portions for locking the flanges of both said hollow portion and said body portion securely together whereby the interengaging members are firmly locked in engagement with each other.

6. A coupling comprising two oppositely disposed substantially identical interengaging members, each of said interengaging members consisting of a body portion having an outwardly tapered socket portion arranged therethrough, a wedge for spreading the end of a flexible member which is adapted to be disposed in said tapered socket portion, an enlarged hollow portion integrally arranged with the body portion on one side thereof and extending outwardly in a longitudinal direction therefrom, said outwardly extending hollow portion having an inwardly extending flange disposed on the outer end thereof, a laterally and outwardly extending flange portion integrally arranged with the body portion adjacent the outer end thereof around that part of the same on the side opposite from that of said outwardly extending hollow portion, said inwardly extending flange carried by that outer end of said outwardly extending hollow portion of one of said interengaging members adapted to lie directly next to and rearwardly of the oppositely disposed flange portion carried by the body portion of the other of said interengaging members and cooperating therewith to securely hold them in engagement with each other, the inner end of each of said wedges having a permanent projection thereon interfering with the assembling of said interengaging members together unless the wedge is driven properly into position in the end of the flexible member in the tapered socket portion, said flange portion arranged on the outer end of the outwardly extending hollow portion and the flange portion arranged on the outer end of the body portion being spaced apart from each other and being so constructed and arranged so that the interengaging members cannot be completely assembled together unless said wedges are properly positioned in the ends of the flexible members, and means for locking the flanges of both said outwardly extending hollow portion and said body portion securely together whereby the interengaging members are firmly locked in engagement with each other.

ALAN E. BRICKMAN.